May 5, 1959     J. A. GRAY ET AL     2,884,887
MACHINE FOR PROCESSING THE REFLECTORS OF SEALED-BEAM LAMPS
Filed June 29, 1953     4 Sheets-Sheet 1
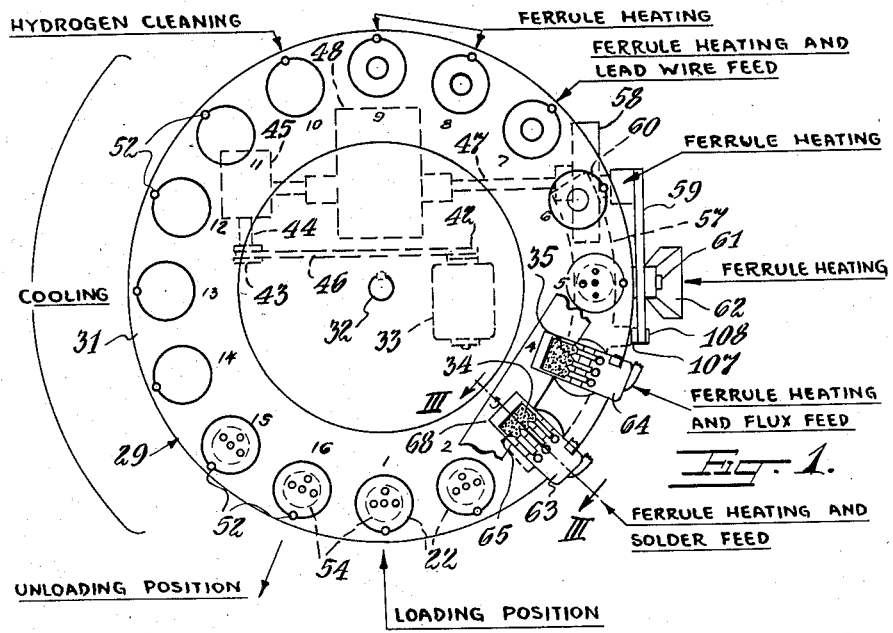
Fig. 1.
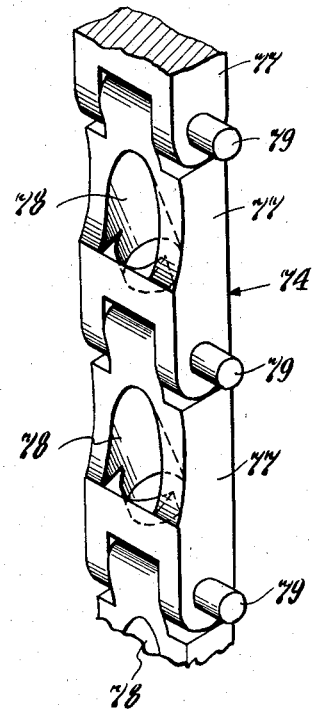
Fig. 7.
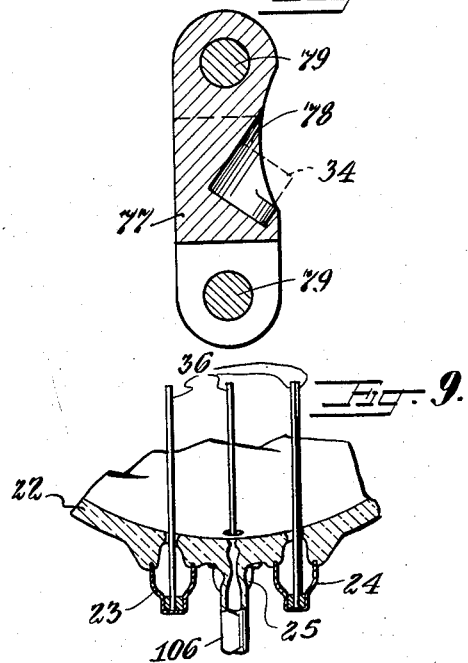
Fig. 8.
Fig. 9.
INVENTORS
J. A. GRAY and
E. K. BEE
BY
ATTORNEY

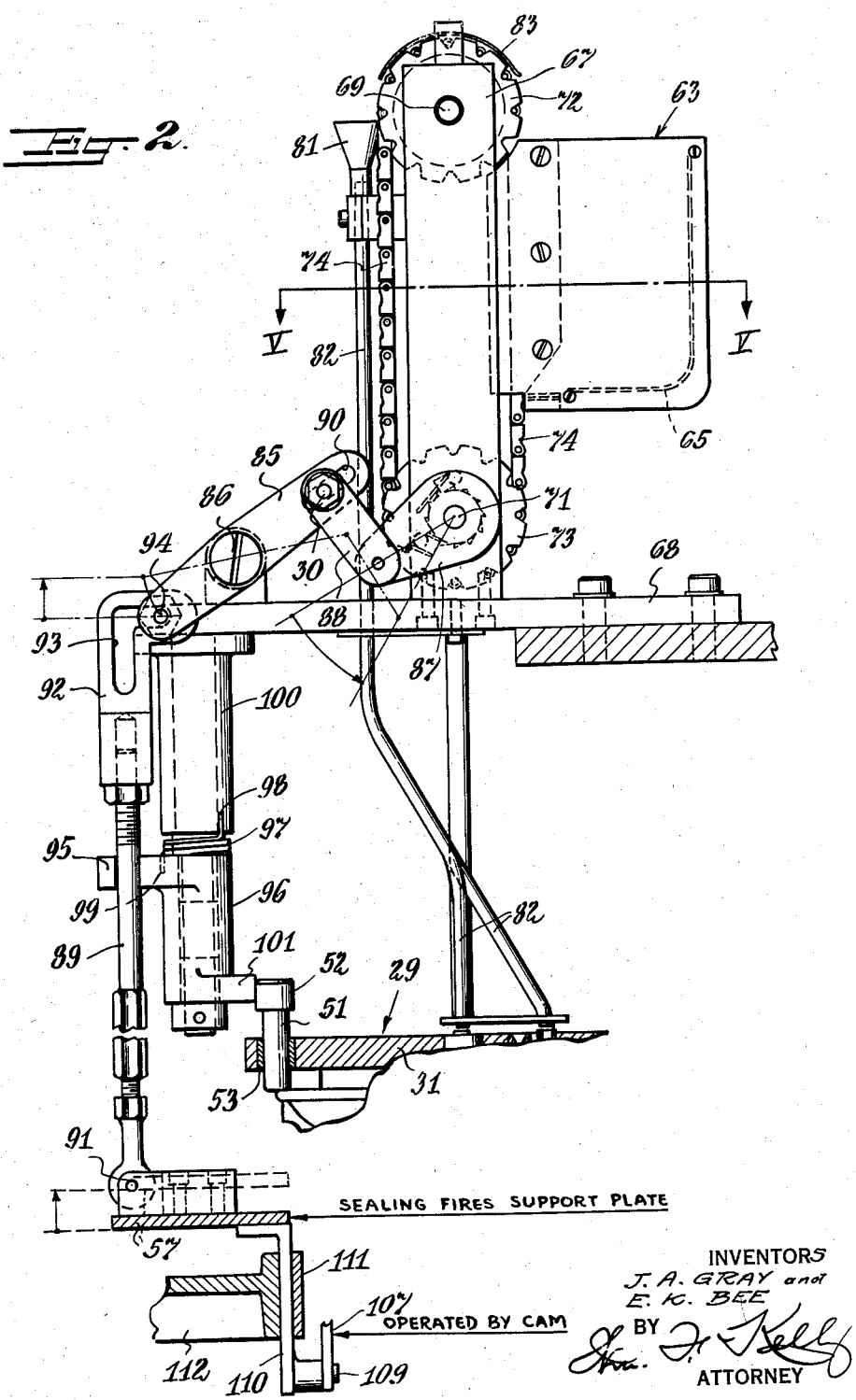

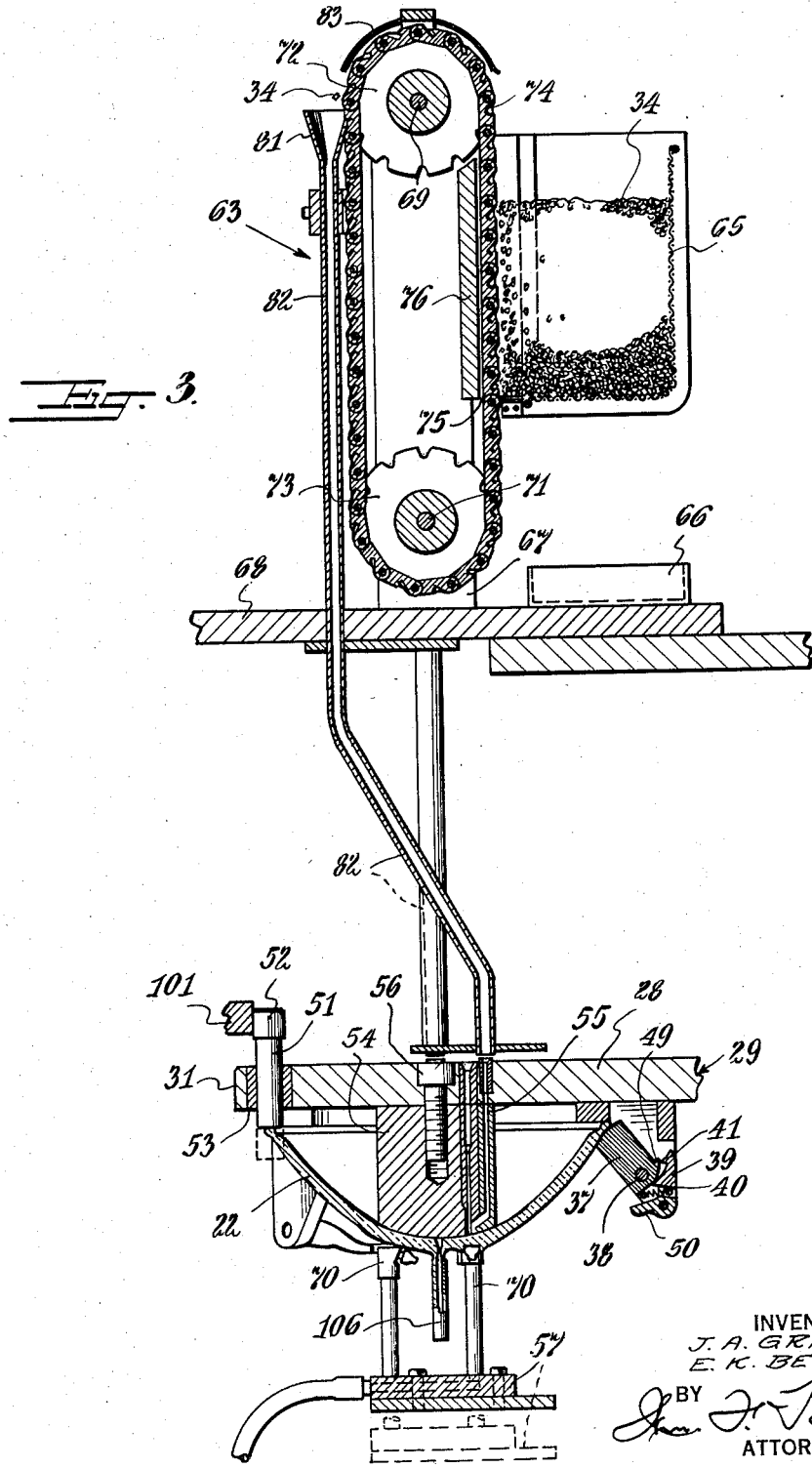

May 5, 1959 J. A. GRAY ET AL 2,884,887
MACHINE FOR PROCESSING THE REFLECTORS OF SEALED-BEAM LAMPS
Filed June 29, 1953 4 Sheets-Sheet 4
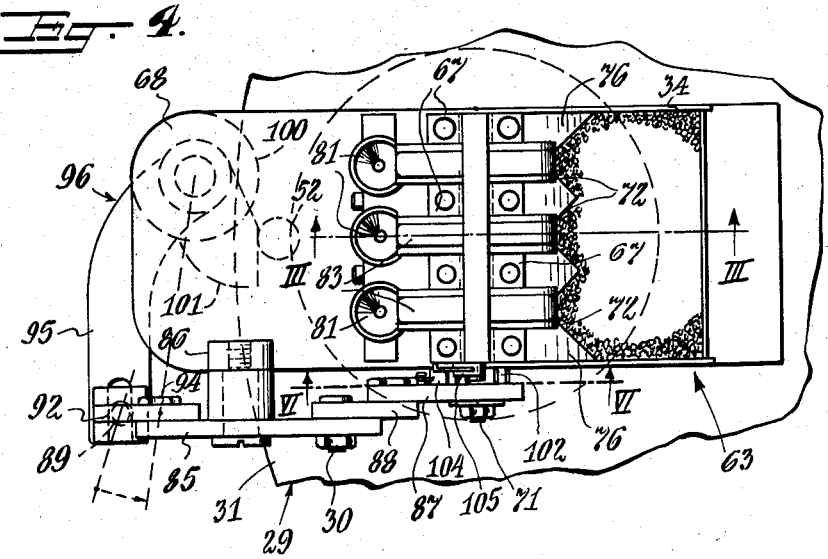
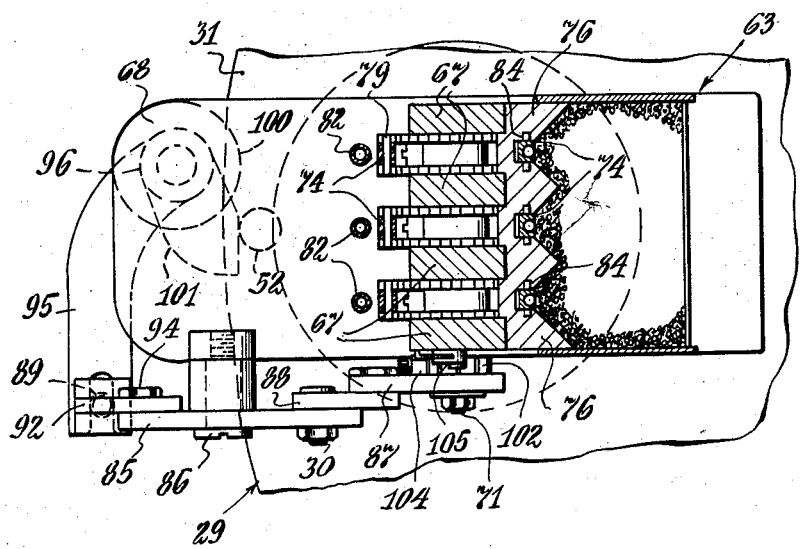
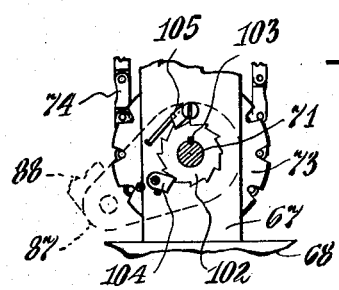
INVENTORS
J. A. GRAY and
E. K. BEE
BY
ATTORNEY

United States Patent Office 2,884,887
Patented May 5, 1959

2,884,887

MACHINE FOR PROCESSING THE REFLECTORS OF SEALED-BEAM LAMPS

John A. Gray and Ernest K. Bee, Fairmont, W. Va., assignors to Westinghouse Electric Corporation, East Pittsburgh, Pa., a corporation of Pennsylvania Application June 29, 1953, Serial No. 364,742

6 Claims. (Cl. 113—59)

This invention relates to a method and machine for securing leads to "sealed beam" lamps and, more particularly, to a sixteen head lead-brazing machine which the reflector portions are automatically fed to and removed from.

The principal object of our invention, generally considered, is to provide for automatic brazing of support leads to the interior of contact ferrules on the reflector portions of sealed beam lamps, and the removal of oxidation from the exterior end portions of said ferrules, so that lugs may then be soldered thereto.

Another object of our invention is to provide improved apparatus for feeding pellets of solder and flux to a machine for securing leads to sealed beam lamp ferrules, and removing oxidation from the exterior of the latter preparatory to soldering lugs thereto, as described and claimed in the McGowan and Hasell, Patent No. 2,748,738, issued June 5, 1956, which is referred to for details of the improved machine not here fully disclosed.

A further object of our invention is improved means in a brazing machine, for heating the ferrules of an indexed reflector of a sealed beam lamp while feeding a pellet of solder or a pellet of flux thereto by a chain-conveyor device synchronized with operation of the machine and means at the next indexed position for heating while feeding pellets of flux or solder to said ferrules by a similar device.

Other objects and advantages of the invention, relating to the particular arrangement and construction of the various parts, will become apparent as the description proceeds.

In the scale drawing:

Figure 1 is a diagrammatic plan view of apparatus embodying our invention.

Figure 2 is an elevational view of apparatus for feeding pellets to sealed beam lamp reflectors when on the machine shown in Figure 1, in the direction of the arrows III—III therein.

Figure 3 is a sectional view on the line III—III of Figures 1 and 4, in the direction of the arrows.

Figure 4 is a plan view of one of the processing material hoppers and associated pellet-carrying chain conveyors.

Figure 5 is a horizontal sectional view on the line V—V of Figure 2, in the direction of the arrows.

Figure 6 is a vertical sectional view on the line VI—VI of Figure 4, in the direction of the arrows.

Figure 7 is a perspective view of a section of a pellet-carrying conveyor chain.

Figure 8 is a longitudinal midsectional view of one of the links of said chain, on the line III—III of Figs. 1 and 4.

Figure 9 is an axial sectional view of a reflector portion of a sealed beam lamp adapted to be handled by apparatus embodying our invention.

In the manufacture of sealed beam lamps, contact or terminal ferrules have sharp edges thereof embedded in the exterior of the reflector portion, around apertures through which supporting leads to the filaments extend. These leads are brazed or soldered to the interior surfaces of such ferrules in a lamp having two filaments and three ferrules, one of said ferrules carrying two leads. After the leads have been brazed to the ferrules, it has been the practice to index the latter while red hot over so-called clean-up cups through which hydrogen was flowing, and immediately surround the hot ferrules with the clean-up cups and attempt to cool them in the hydrogen atmosphere. The results were not consistent, and in most cases the ferrules were only partially cleaned of oxidation. It was also necessary to make such clean-up cups conform exactly to the shape of the ferrules.

In accordance with the above mentioned McGowan et al. patent, oxidation is removed from such ferrules by indexing the latter while red hot over clean-up cups from which hydrogen flows and which are raised toward the ferrules. The cups are stopped in their upward motion approximately ½" from the ferrules for approximately 2 seconds, during which period the flowing hydrogen ignited by the heat of the ferrules, burns off the oxidation. Further upward movement of the cups, which are made only to fit the large diameter of the ferrules, smothers the hydrogen flames. The cups remain in such position for about two seconds, thereby cooling the ferrules in a hydrogen atmosphere, whereupon they are removed and the ferrules further cooled in blasts of air.

In addition to this ferrule cleaning, said patent discloses automatic apparatus including a conveyor for indexing the ferrule-carrying reflector portions of sealed beam lamps, step by step; mechanism at a certain location transferring such reflector portions one by one from said conveyor to a head on an automatic brazing machine, said machine performing automatically the operations of heating while feeding; first, solder pellets, then flux pellets, and then lead-in support wires to the ferrules, thereby automatically assembling the parts, and subsequently cooling them in hydrogen and then in air for transfer back to the conveyor from whence they are, in turn, moved to a mounting machine.

The present application discloses an improvement in the mechanism for feeding pellets of processing material to the sealed beam reflectors as they are indexed, said improvement involving the employment of chain conveyors for carrying pellets, one at a time, from a hopper to each of the ferrules of sealed beam reflectors as they are indexed adjacent said hopper. The movement of said conveyors is controlled by the upward and downward movement of the same plate that carries the burners for melting the flux and solder employed for brazing the leads to said reflectors, thereby dispensing with a separate motor for driving the pellet-feeding mechanism, and as disclosed in the application previously referred to.

The apparatus of said patent comprises the following parts which are described in order, the reference characters used being also those of the present case.

There is shown a conveyor for transporting the aluminized or reflecting portions 22, of sealed beam lamps, termed "reflectors" for short, and each carrying three contact ferrules, that is end ferrules 23 and 24 and a "center" ferrule 25, from a position, at which the reflectors are loaded by hand, from the machine, which applies the aluminizing or aluminum reflecting coating thereto, to transfer or loading apparatus which moves each reflector from the station, when indexed thereat, to a head 54 on the brazing machine 29, when said head is indexed at a position adjacent said conveyor. The operator places each reflector in a head of the conveyor in such position that the plane of the end ferrules 23 and 24, and exhaust 106, coincides, at least approximately, with the mid-vertical longitudinal plane of the conveyor.

The brazing machine 29 comprises a spider 31, which is supported on a pedestal and vertical shaft 32 carried thereby and to which it is keyed (Figure 1), and driven by a motor 33 so that it rotates intermittently and indexes the heads, or blocks secured to a peripheral plate portion 28, and forming heads 54 therewith (Fig. 3), step by step, at each of sixteen stations about the periphery thereof.

Calling the station "1" at which a head 54 is indexed when it first receives a reflector 22 from transfer apparatus, said deflector is moved through station "2" and indexed at station "3," where it is heated and a pellet 34 of solder (or flux) is fed to each of its ferrules 23, 24 and 25. At station "4," while still being heated, a pellet 35 of flux (or solder, if the first set of pellets fed thereto was flux) is fed to each of its ferrules, 23, 24 and 25. The reflector then passes through heating stations "5," "6," and on to station "7" where one lead wire 36 is fed to each of two ferrules 23 and 25 and two lead wires 36 are fed to other end ferrule 24.

At stations "8" and "9" ferrule heating is continued insuring that the lead wires become well embedded in the fluxed solder for securing said leads to said ferrules. At station "10" cups from which hydrogen flows pass into the vicinity of said ferrules, the stream of hydrogen from the cups being ignited by the heat from the ferrules and burning off the oxidation thereof. The hydrogen cups then move further upward, enveloping the lower portions of the ferrules, snuffing the hydrogen flames, and insuring that said ferrules are cooled in hydrogen, thereby preventing re-oxidation.

After withdrawal of the cups, said ferrules are cooled at stations "11," "12," "13," "14" and "15," by jets of air.

At station "16" the reflectors with leads embedded in and secured to the de-oxidized ferrules, are unloaded from the brazing machine and transferred back to the conveyor. The conveyor, on moving two stations further reaches a transfer or unloading device which removes therefrom the reflectors, one by one, for transfer to a mounting machine.

Driving mechanism

All of the apparatus, heretofore generally described, is in the embodiment illustrated driven from a single source of power such as the motor 33, so that the parts operate in the desired synchronism. The motor 33 has a pulley or sprocket wheel 42 which drives the pulley or sprocket wheel 43 on a shaft 44 from reduction gear box 45, by means of a belt or chain 46. Turning the shaft 44 causes turning of the shaft 47 to which it is geared. This in turn causes the step by step, or indexing, rotation of the spider 31, carrying the heads 54, through mechanism in gear box 48, including a cam wheel (not shown) with axially offset portions sequentially engaging rollers on arms outstanding from a shaft to which they are secured. Such mechanism being standard in such equipment (see, for example, the drive for the spider 106 through its vertical shaft 108 by gear 112 carried thereon and formed by a series of rollers 113; with which application arms 80 and rollers 50 correspond; driven by wheel 114 formed with a trough portion which joins axially offset trough portions 120 and 130; with which the unillustrated present cam wheel may correspond; forming a cam device for driving the spider step-by-step, as disclosed in the Green Patent No. 2,569,852 dated October 2, 1951), is not illustrated in detail.

Removing reflector from transferring apparatus to head at station "1" and unloading reflectors at station "16" of brazing machine Each head 54 on the brazing machine 29 is formed with a plurality, preferably three latches 37 which swing from release or upper position to locking position illustrated in Figure 3, where they underlie the rim of a reflector and hold it in place on a head of the brazing machine when indexed at station "1." Each latch or reflector clamping cam 37 pivots about a pin 38 and has a keeper 39 which, when in the position of Figure 3, tends to pull the latch to reflector-supporting position by means of spring 40, as there shown, while when in the upper position, a keeper hook portion 41 overlies a latch lug 49 and holds the latch 37 in unlocking position. It tends to stay in such position due to action of the spring 40, until released by moving the tail 50 of the keeper upwardly until the hook portion 41 moves away from the lug 49. This locking and unlocking action is made use of in the loading of reflector on, and unloading of the reflector from, the brazing machine, as is explained in the application referred to.

In moving to latched or clamped position, the reflector 22 also pushes upwardly on a rod 51 carrying a roller 52 at its upper end, which is to perform a function later described. The rod 51 slides in a bushing 53 through which a set screw (not shown, but corresponding with the set screw 211 of the application referred to) passes. The inner end portion of the set screw is received in a keyway in the rod 51 to limit its travel. The lower surface of the plate portion 28 carries a block forming, with the plate portion 28, heads 54 in which are passages 55 for feeding reflector-processing materials to the ferrules 23, 24 and 25, in a manner which will be later explained. Each block is held in place beneath the plate 28 by means of a bolt 56.

After the reflectors have been processed on the brazing machine, they are removed from station "16" thereof by mechanism similar to the loading mechanism, as disclosed in the application referred to.

Mechanism for vertically reciprocating the fires and operating the feed mechanism for the solder, flux and leads At stations "3" to "9," inclusive, through which the reflectors are sequentially moved, the ferrules of said reflectors are heated by fires from gas fixtures 70, as disclosed in the application referred to. These fixtures are mounted on a pair of manifold plates like those numbered 241 and 242 in the application referred to, preferably three on one plate and four on the other, and simultaneously raised as each reflector is indexed at a given station. For simplicity, here the plates are indicated in Figs. 2 and 3 at 57 as unitary. This plate 57 is vertically reciprocated by mechanism operated from a manifold-operating or fire-lifting cam 58 fixed on the shaft 47. Rotation of the cam 58 oscillates the lever 59 carrying roller 60 riding therein, and fixed on a shaft 61 carried by bracket 62 from a frame portion of the brazing machine. The other end of the lever 59 is connected to a link 107 by pivot pin 108. The other end of said link 107 is pivotally connected by pin 109 to a manifold-supporting member 110, slidably mounted in guide 111 carried by a frame portion 112, as in accordance with the application referred to.

Solder and flux feeding mechanism

The manifold plate 57 not only raises and lowers the fires as needed, upon indexing of the reflectors, but also operates the mechanism 63 for feeding pellets of solder (or flux) to the reflector ferrules and the mechanism 64 for feeding pellets of flux (or solder, as the order of feeding the solder and flux is not essential) to said ferrules.

The feeding mechanism 63 comprises a hopper 65 desirably formed of a screen material, so that dust and broken pellets will sift out into a receptacle 66. The hopper is supported on standards 67 upstanding from a platform 68 supported by the frame of the machine. A pair of rotatable shafts 69 and 71 extend between said standards. Fixed thereon are three upper sprocket wheels 72 and three lower sprocket wheels 73, if reflectors each with three ferrules are to be processed. A sprocket chain 74 passes over each pair of wheels 72 and 73, forming conveyors for the pellets 34 in the hopper 65. In order to be able to collect pellets from the hopper, the chains 74 pass through apertures 75 in the bottom of the hopper and in grooves along the adjacent side wall 76 thereof, as viewed in Fig. 5.

In order to serve for properly collecting the pellets 34, which are preferably in the form of short cylinders, each link 77 of the chains 74 is formed with an outwardly opening cylindrical pocket 78, as shown most clearly in Fig. 8, of a size to freely receive just one pellet 34 as there shown. The individual links are pivoted together by means of pins 79. Premature discharge of the pellets into the funnel-shaped upper end portions 81 of the tubes 82 for conducting the pellets to the respective ferrules of a reflector, is prevented by means of guard 83 over the top of each chain, said guard continuing to near the top of the funnel shaped upper end portion 81, as shown in Fig. 3.

As shown most clearly in Figs. 4 and 5 there are three conveyor chains for each of the feeding devices 63 and 64, as each reflector has three ferrules each of which is to receive a pellet of solder and a pellet of flux. A change in the number of ferrules would involve a corresponding change in the pellet-feeding mechanism. The pivot members 79 of the chains project beyond the sides thereof and are guided in corresponding grooves 84 in the hopper wall 76, as shown most clearly in Fig. 5.

Movement of the conveyor chains is effected by vertical reciprocation of the lifting plate 57, which carries the gas fixture 70, by means of mechanism such as shown in Fig. 2. The shaft 71 carrying the drive or lower sprocket wheels 73 is operated by a lever 85 pivotally mounted at 86 above platform 68, and connected to a lever 87 rotatable on said shaft, by means of a link 88. One end of the link 88 is connected by means of a bolt 30 adjustably received in a slot 90 in the adjacent end portion of the lever 85. The lever 85 is operated by vertical reciprocation of connecting rod 89, the lower end of which is pivotally connected to the plate 57, as indicated at 91, and the upper end of which has a head 92 with an L-shaped slot 93, receiving the pivot pin 94 connecting it to the lever 85.

The connecting rod 89 is received between bifurcations at the free end of the arm 95 of a bell crank lever 96, biased to the right, as viewed in Fig. 2, by coil spring 97. One end of said spring is held in a socket 98 in a standard 100, depending from the frame of the machine, on which said bell crank lever is pivoted, and the other end of which is received in a pocket 99 in the arm 95, thereby urging the connecting rod 89 to the right. When in the right hand position, its pin 94 was disposed in the vertical portion of the slot 93, whereby reciprocation of the plate 57 merely results in the pin 94 sliding in said vertical portion without turning the lever 85.

However, when a reflector 22 is in place, it pushes the rod 51 to uppermost position, moving its roller 52 so that the other arm 101 of the bell crank lever 96 slides over said roller on indexing and is moved clockwise, as viewed from above. This moves the connecting rod 89 outwardly, so that the pin 94 is received in the horizontal portion of the slot 93, as shown in Fig. 2, whereby vertical reciprocation of the plate 57 results in oscillation of the lever 85 to, each time the plate 57 moves upwardly, cause the lower sprocket wheel 73 to move one notch and thereby deposit one pellet of solder or flux, as the case may be, in each of the receiving funnel portions 81.

This movement of the sprocket wheel 73 by the lever 87 is effected by a ratchet 102 secured on the shaft 71, as by means of a key 103, and a pawl 104 spring-pressed into engagement with said ratchet and mounted on the lever 87, as shown most clearly in Figs. 4, 5 and 6. Reverse movement of the ratchet 102 is prevented by retaining pawl 105, also spring biased into engagement therewith, and pivotally mounted on one of the standards 67.

It will, therefore, be seen that as the machine operates and the plate 57 reciprocates vertically, at each indexing of a reflector on a head adjacent a pellet-feeding device, a single pellet is fed to each ferrule, through a conveying tube 82. If a reflector is missing, the rod 51 drops to lowermost or inoperative position, allowing the bell crank 96 to swing counter-clockwise, as viewed from above, and carry the slotted head to the inoperative relationship with respect to the pin 94, thereby insuring that pellets are not fed from the mechanism if a reflector happens to be missing at the time.

The mechanism 64 for feeding pellets of flux (or solder) 35 from the hopper 65 of the mechanism 64 to the tubes 82 thereof, and from there to the underlying ferrules of a reflector, is identical with the mechanism 63, so corresponding reference characters have been applied, and a detailed description thereof will not be undertaken. It will, therefore, be seen that at station "4," a pellet of flux (or solder) is fed to each of the tubes 82 and from there to the corresponding ferrules therebeneath, so that each ferrule then contains fluxed solder.

*Lead wire feeding mechanism*

After being indexed at stations "5" and "6," where further heating of the ferrules is effected, each head is indexed at station "7" where lead wires are fed thereto while the ferrule heating is continued. The lead wire feeding mechanism is illustrated in Figures 7 to 10, inclusive, and fully disclosed in the application previously referred to.

On account of the construction of the reflectors for supporting two filaments, it is necessary to have two lead wires fed to one ferrule, said ferrule being that designated 24 as viewed in Figure 9. Therefore, two of the lead-feeding chutes merge to one before feeding to the tube which is directly above the ferrule 24, which happens to be the leading end ferrule. Four chutes thus deliver leads to three tubes, the lower ends of which are held in a block secured to an arm on a tube mounted in a hopper support casting, as in the embodiment of the application previously referred to, which application also discloses all features of the improved machine which have not been changed in accordance with the present case.

From the foregoing disclosure, it will be seen that we have provided apparatus to which sealed beam lamp reflectors, carrying ferrules and an exhaust tube 106, after manual delivery to a conveyor at the right end portion, are automatically processed. In other words, such reflectors are, without further manual operations, transferred to a brazing machine where each ferrule thereof has solder and flux applied by improved mechanism synchronized with indexing of the machine, and lead wires placed therein, while being heated so that said lead wires are securely brazed thereto. The exterior end portions of the ferrules are then deoxidized in hydrogen flames and subsequently cooled in flowing hydrogen after snuffing of said flames. Quick further cooling of the ferrules in air is then effected to avoid undesired reoxidation. Said ferrules are then transferred back to the conveyor, from which they are automatically removed adjacent the left-hand end, for processing in a mounting machine.

Although a preferred embodiment has been disclosed, it will be understood that modifications may be made within the spirit and scope of the invention. For example, in the specification processing material means flux, solder, or combined flux and solder if a combination were developed whereby both solder and flux could be simultaneously applied as a single pellet. In such a case, as is obvious, stations "3" and "4" could be combined, that is, a single hopper and feeding mechanism could be employed for simultaneously feeding pellets of such hypothetical processing material combining both flux and solder.

We claim:

1. In a brazing machine for securing leads to the ferrules of sealed beam lamp reflectors, a head carried by said machine for supporting said reflectors and indexing them into a predetermined position, means for feeding pellets of processing material to said ferrules comprising a hopper disposed adjacent a reflector while on a head in such indexed position, a chain conveyor for raising processing material from said hopper and intermittently operable by said machine simultaneously with the indexing of a reflector into its predetermined position, said conveyor comprising a pair of sprocket wheels one above the other and both above each ferrule of a reflector when the latter is on said head and at an indexed position, a sprocket chain passing over each pair of sprocket wheels to form chain sets, each link of each chain set having a pellet-receiving cavity opening upwardly and outwardly, said hopper being apertured for the reception of the upwardly movable section of said chain, and a tube with a flaring top end portion adjacent each top sprocket wheel, on the other side thereof from said hopper, to receive pellets of processing material and carry them to the ferrules of a sealed beam reflector when indexed on said head to a position beneath the lower end of each tube.

2. In a brazing machine for securing leads to the ferrules of reflectors for sealed beam lamps, a spider rotatable about a vertical axis, a plurality of heads on said spider arranged in a circle about said axis, each of said heads being formed to hold one of said reflectors, means for rotating said spider step by step about said axis and indexing the heads thereon through a plurality of circumferentially disposed stations, means for feeding pellets of processing material to said ferrules comprising a hopper carried by said machine adjacent a reflector while on a head at an indexed station, a chain conveyor intermittently operable in synchronism with the indexing of the heads by said spider for raising processing material from said hopper, said conveyor comprising a pair of sprocket wheels one above the other and both above each ferrule of a reflector, a sprocket chain passing over each pair of wheels to form chain sets, each link of each chain set having a pellet-receiving cavity opening upwardly and outwardly, said hopper being apertured for the reception of the upwardly movable section of said chain to collect pellets in said pockets, and a tube with a flaring top end portion adjacent each top sprocket wheel on the other side thereof from said hopper, to receive pellets of processing material and carry them to the ferrules of a sealed beam reflector when indexed on said head to a station beneath the lower end of each tube.

3. In a brazing machine for securing leads to the ferrules of reflectors for sealed beam lamps, a spider rotatable about a vertical axis, a plurality of heads on said spider arranged in a circle about said axis, each of said heads being formed to hold one of said reflectors, means for rotating said spider step by step about said axis and indexing the heads thereon through a plurality of circumferentially disposed stations, means at a series of indexed stations for heating the ferrules of indexed reflectors, a plate carrying said heating means, means for feeding pellets of processing material to said ferrules while so heated comprising a hopper carried by said machine adjacent a reflector while on a head at an indexed station, a pair of sprocket wheels one above the other and both above each ferrule of a reflector, a sprocket chain passing over each pair of sprocket wheels to form chain sets and intermittently operable in synchronism with said ferrule heating means, each link of each chain set having a pellet-receiving cavity opening upwardly and outwardly, pivot means connecting the links of said chain together, said pivot means extending outwardly beyond their chain, each hopper being apertured for the reception of the upwardly movable section of said chain and having a wall grooved for guidingly receiving the extensions of said pivot means, and a tube adjacent each top sprocket wheel to receive pellets of processing material and carry them to the ferrules of a sealed beam reflector when indexed on said head to a station beneath the lower end of each tube.

4. In a brazing machine for securing leads to the ferrules of reflectors for sealed beam lamps, a head carried by said machine for supporting said reflectors and indexing them into a predetermined position, means spaced about said machine for heating the ferrules of indexed reflectors while on said head at such predetermined position, a plate carrying said heating means, means for vertically reciprocating said plate to carry said heating means to and from operative position, means for feeding pellets of processing material to said ferrules while so heated and operated by said plate, comprising a lower sprocket wheel for each ferrule of a reflector, an upper sprocket wheel for each lower sprocket wheel, a sprocket chain passing over each pair of wheels to form chain sets and intermittenly operable in synchronism with said ferrule heating means for the indexed reflectors, each said chain set having pellet-receiving cavities, said hopper being apertured for the reception of the upwardly movable section of said chains to collect pellets in said pockets, and a tube adjacent each top sprocket wheel to receive pellets of processing material and carry them to the ferrules of a sealed beam reflector when indexed on a head to a position beneath the lower end of each tube.

5. In a brazing machine for securing leads to the ferrules of reflectors for sealed beam lamps, a spider rotatable about a vertical axis, a plurality of heads on said spider arranged in a circle about said axis, each of said heads being formed to hold one of said reflectors, means for rotating said spider step-by-step about said axis and indexing the heads thereon through a plurality of circumferentially disposed stations, means spaced about said machine for heating the ferrules of indexed reflectors, a plate carrying said heating means, means for vertically reciprocating said plate to carry said heating means to and from operative position, means operable in synchronism with said spider rotating means and said plate reciprocating means for feeding pellets of processing material to said ferrules comprising a hopper carried by said machine adjacent a reflector while on said head in an indexed position, an intermittently operable chain conveyor for raising processing material from said hopper, said conveyor comprising a pair of rotatable shafts, sprocket wheels fixed on said shafts, one above the other and both above each ferrule of a reflector, a sprocket chain passing over each pair of wheels and forming a series of chain sets, each link of each chain set having a pellet-receiving cavity opening upwardly and outwardly, said hopper being apertured for the reception of the upwardly movable sections of said chain sets to collect pellets in said pockets, a tube with a flaring top end portion adjacent each top sprocket wheel on the other side thereof from said hopper to receive pellets of processing material and carry them to the ferrules of a sealed beam reflector indexed on said head to a station beneath the end of each tube, a guard overlying each upper sprocket wheel to prevent premature ejection of processing material from said pockets, a ratchet fixed on the lower shaft, a lever pivoted on said shaft, a pawl carried by said lever, a spring urging said pawl into engagement with said ratchet, and means operated by said plate for said heating means for oscillating said lever for turning the lower sprocket wheel step-by-step to feed to each tube one pellet of processing material at each indexing movement of a reflector.

6. In a brazing machine for securing leads to the ferrules of reflectors for sealed beam lamps, a spider rotatable about a vertical axis, a plurality of heads on said spider arranged in a circle about said axis, each of said heads being formed to hold one of said reflectors, means for rotating said spider step-by-step about said axis and indexing the heads thereon through a plurality of circumferentially disposed stations, means at a series of the stations for heating the ferrules of indexed reflectors, a plate carrying said heating means, means operable in timed relation with said spider rotating means for vertically reciprocating said plate to carry said heating means to and from operative position, means also operable in timed relation relative to said spider rotating means and said plate reciprocating means for feeding pellets of processing material to said ferrules while so heated comprising a hopper carried by said machine adjacent a reflector while on said head in an indexed position, a chain conveyor for raising processing material from said hopper, said conveyor comprising a pair of rotatable shafts, sprocket wheels fixed on said shafts, one above the other and both above each ferrule of a reflector, an intermittently operable sprocket chain passing over each pair of wheels to form chain sets, each link of each chain set having a pellet-receiving cavity opening upwardly and outwardly, said hopper being apertured for the reception of the upwardly-movable section of said chains to collect pellets in said pockets, a guard overlying each upper sprocket wheel to prevent premature ejection of processing material from said pockets, a tube with a flaring top end portion adjacent each top sprocket wheel, on the other side thereof from said hopper, to receive pellets of processing material and carry them to the ferrules of a sealed beam reflector when indexed on said head to a station beneath the end of each tube, a ratchet fixed on the lower shaft, a lever pivoted on said shaft, a pawl carried by said lever, a spring urging said pawl into engagement with said ratchet, and means operated by said plate for said heating means for oscillating said lever for turning the lower sprocket wheel step-by-step to feed to each tube one pellet of processing material at each indexing movement, and spring-biased means for rendering inoperative said plate-operated means upon a sealed beam reflector being missing from its head.

References Cited in the file of this patent

UNITED STATES PATENTS

| | | |
|---|---|---|
| 1,096,149 | Bragstad | May 12, 1914 |
| 1,125,427 | Woodson | Jan. 19, 1915 |
| 1,326,117 | Thomas | Dec. 23, 1919 |
| 1,673,281 | Fay | June 12, 1928 |
| 1,688,263 | Bullard | Oct. 16, 1928 |
| 1,884,683 | Hermani | Oct. 25, 1932 |
| 2,038,525 | Cate | Apr. 28, 1936 |
| 2,082,080 | Palucki | June 1, 1937 |
| 2,533,919 | Christiansen et al. | Dec. 12, 1950 |
| 2,547,476 | Lehmann | Apr. 3, 1951 |
| 2,572,164 | Lehmann | Oct. 28, 1951 |
| 2,720,855 | Brent et al. | Oct. 18, 1955 |
| 2,748,738 | McGowan et al. | June 5, 1956 |